Figure 1:
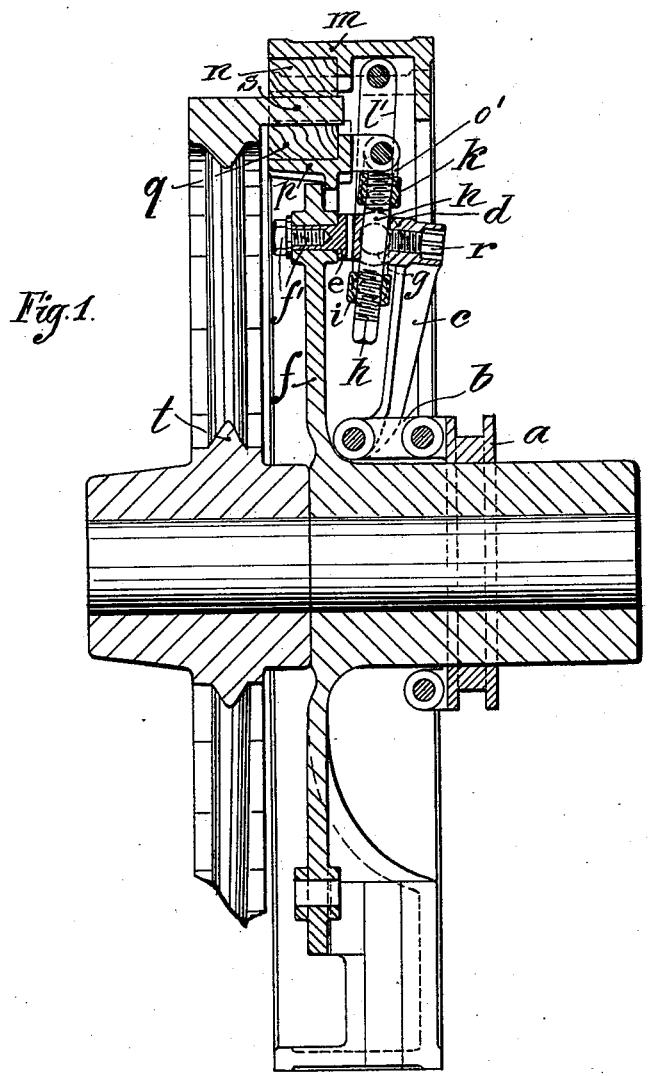

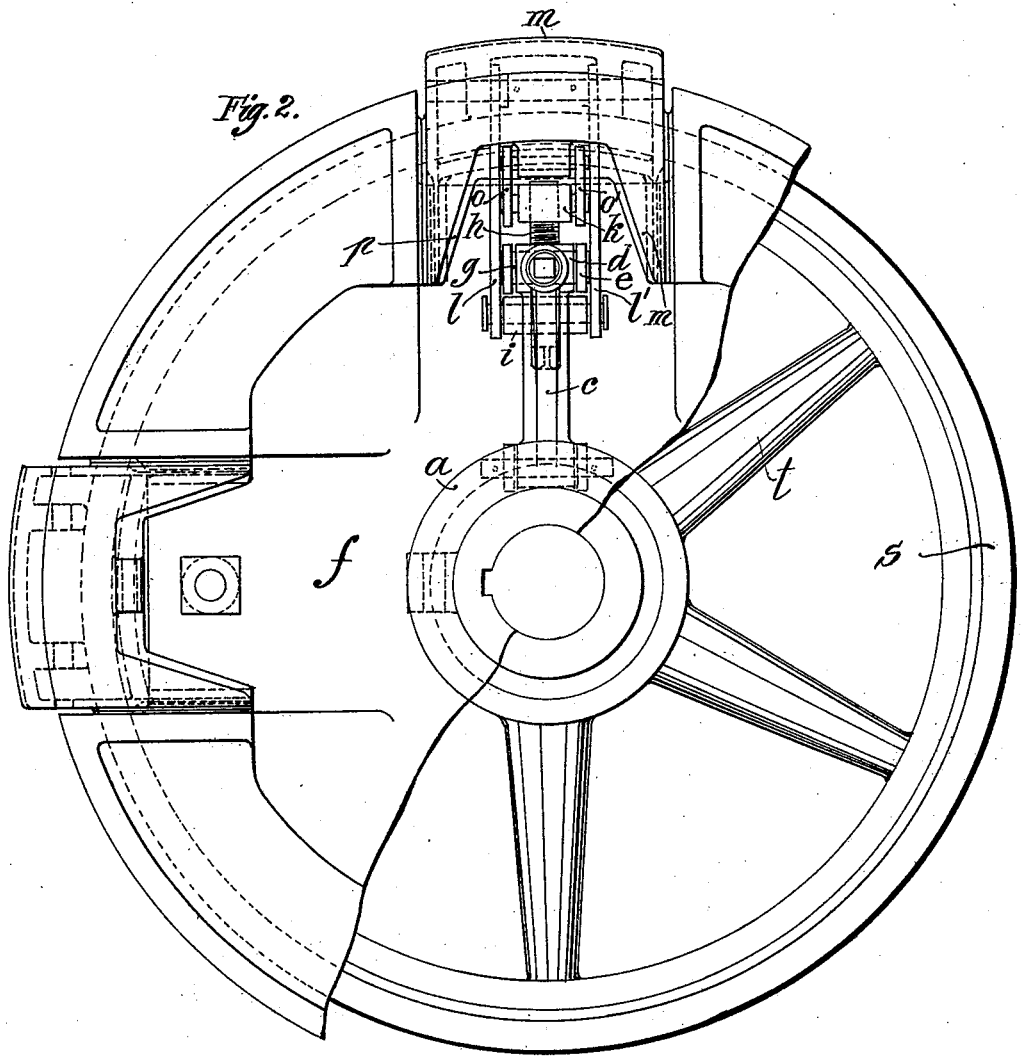

UNITED STATES PATENT OFFICE.

FRIEDRICH LEHMANN, OF LEIPSIC-EUTRITZSCH, GERMANY.

FRICTION-CLUTCH.

SPECIFICATION forming part of Letters Patent No. 683,563, dated October 1, 1901.

Application filed February 6, 1901. Serial No. 46,255. (No model.)

*To all whom it may concern:*

Be it known that I, FRIEDRICH LEHMANN, a subject of the Emperor of Germany, residing at Leipsic-Eutritzsch, German Empire, have invented an Improved Friction-Clutch, of which the following is a specification.

The following invention consists of a new and improved friction-clutch, by means of which the friction elements can be brought into the firmest possible gripping position by a simple and easy manipulation.

In the accompanying drawings, in which similar letters of reference refer throughout to similar parts, Figure 1 illustrates in sectional elevation a friction-clutch embodying the present invention. Fig. 2 is a partially-broken-away front view of Fig. 1.

The clutch-disk $f$ is centrally provided with the well-known sleeve, through which the shaft is adapted to pass. Mounted on said sleeve is a sliding ring $a$, carrying the link $b$, to which is pivotally connected one end of a bent lever $c$. The upper end of said lever terminates in a boss $d$, provided with both a longitudinal and a transverse opening. The boss aforesaid is provided with trunnions $g$ on both its sides and pivoted therewith in a fork $e$, fastened on said disk $f$ by a screw $f'$, said trunnions $g$ thus forming the fulcrum of the bent lever aforesaid. In the transverse opening in said boss a spindle $h$ is mounted, which is provided on its opposite ends with right and left threads, engaging which latter are nuts $i$ and $k$. Links $l$ and $l'$ are pivotally connected with said nut $i$ at their lower ends, while at their upper ends they engage the outer cheek $m$. (See Fig. 1.) Similar links $o$ and $o'$ are employed for connecting nut $k$ and the inner cheek $p$. Mounted in the longitudinal opening aforesaid in boss $d$ is a set-screw $r$, bearing with its inner end on said spindle. Suitable friction-shoes $n$ and $q$ are mounted in their respective cheeks and are, as is obvious, adapted to firmly engage on the opposite sides an annular flange $s$, formed on the driving member $t$, when by loosening screw $r$ the spindle $h$ is turned so as to draw the shoes against the flange aforesaid. When thus turning said spindle, it is obvious that it slides within the boss $d$, and thereby automatically changes its pivot, so as to assume at all times its proper position in the boss $d$. The clutch having been suitably adjusted, the screw $r$ is again screwed in, thereby holding spindle $h$ in its proper position.

In place of spindle $h$ I may employ any modified form of construction of a lever or arm which permits the respective necessary movement of the shoes aforesaid.

Having now described the invention, what I claim as new, and desire to protect by Letters Patent, is—

In a friction-clutch the combination of a disk, a fork thereon, a lever pivoted therein, a boss on said lever, a spindle therein having right and left threads on its opposite ends, nuts engaging said threads, links connected with said nuts, friction-shoes connected respectively with said links a wheel, an annular flange thereon extending between said shoes and a set-screw in said boss engaging said spindle substantially as described.

FRIEDRICH LEHMANN.

Witnesses:
RUDOLPH FRICKE,
CHAS. J. BURT.